455-608    AJ 233    EX
FIP 9106   XR    4,217,493

United States Patent [19]

Hubbard

[11] 4,217,488
[45] Aug. 12, 1980

[54] SECURE OPTICAL COMMUNICATION COMPONENTS, METHOD, AND SYSTEM

[75] Inventor: William M. Hubbard, Colts Neck, N.J.

[73] Assignee: Bell Telephone Laboratories, Incorporated, Murray Hill, N.J.

[21] Appl. No.: 761,283

[22] Filed: Jan. 21, 1977

[51] Int. Cl.² ............................................. H04B 9/00
[52] U.S. Cl. .................................. 455/612; 350/96.33; 455/608
[58] Field of Search ........... 350/96 WG, 96.33, 96.24, 350/96.25, 96.28, 96.29, 96.30; 250/199; 179/1.5 E, 1.5 R, 1.5 M, 15 AP, 15 AN

[56] References Cited

U.S. PATENT DOCUMENTS

| | | | |
|---|---|---|---|
| 2,984,706 | 5/1961 | Jamison et al. | 179/15 |
| 3,083,267 | 5/1963 | Weller | 179/15 |
| 3,112,370 | 11/1963 | Longton | 179/15 BF |
| 3,190,735 | 6/1965 | Kapany | 350/96.24 |
| 3,253,500 | 5/1966 | Hicks, Jr. | 88/1 |
| 3,554,721 | 1/1971 | Gardner | 350/96.24 |
| 3,734,594 | 5/1973 | Trambarulo | 350/96 B |
| 3,779,628 | 12/1973 | Kapron et al. | 350/96 WG |
| 3,810,802 | 5/1974 | Bultite | 156/158 |
| 3,823,996 | 7/1974 | Kompner | 350/96 WG |
| 3,875,534 | 4/1975 | Haven | 179/1.5 R |
| 3,951,515 | 4/1976 | Allard | 350/96 C |
| 3,990,009 | 11/1976 | Lentz | 325/41 |
| 4,000,416 | 12/1976 | Goell | 250/199 |
| 4,062,618 | 12/1977 | Steensma | 350/96 WG |
| 4,070,091 | 1/1978 | Taylor et al. | 350/96 WG |

FOREIGN PATENT DOCUMENTS

| | | | |
|---|---|---|---|
| 284161 | 10/1965 | Australia | 350/96.32 |
| 1172272 | 11/1969 | United Kingdom | 250/199 |

OTHER PUBLICATIONS

Mayo—A Bipolar Repeater for PCM Signals—Bell Syst. Tech. Jour., Jan. 1962, pp. 25, 66, 67, 84–87.
Davis—An Experimental PCM System for Short Haul Trunks—Bell Syst. Tech. Jour., Jan. 1962, pp. 1–24.
The First Secure Fiber Optics Communication Link—Telesis—1976/3, Aug. 1976, vol. 4, No. 7, pp. 221, 222.
Fulenwider et al., Optical T-carrier systems on Glass-fiber Cable, A Promising New Technology—Telephony, Jun. 2, 1975, pp. 34–38.

*Primary Examiner*—Robert L. Griffin
*Assistant Examiner*—Joseph A. Orsino, Jr.
*Attorney, Agent, or Firm*—Sylvan Sherman; Daniel D. Dubosky

[57] ABSTRACT

A transmitter of information to be communicated in secure form is optically coupled to a composite optical fiber at one end, the fiber being connected to a receiver of the secure information at the other end. The composite optical fiber has cores including a central core for carrying the secure information, one or more guard signal cores, a cladding matrix surrounding all the cores, and a metallic or other nontransmissive film surrounding the central core but not the guard cores. A guard signal optical transmitter section is coupled to the guard cores for jamming any leakage of secure information through the film, and a guard signal receiver section is provided at the other end of the fiber for monitoring purposes. The optical transmitter apparatus employs pulse code modulation (PCM) and sends related security bits in the guard and secure signals. The optical receiver apparatus features amplitude monitoring and a comparison of the related security bits and provides a warning when unexpected changes indicative of tampering are observed.

13 Claims, 10 Drawing Figures

SECURE OPTICAL COMMUNICATION COMPONENTS, METHOD, AND SYSTEM

BACKGROUND OF THE INVENTION

The present invention relates to optical communications systems. More particularly, the present invention relates to optical communications systems for providing an increased degree of security in the transmission of communications information.

In prior art optical fiber communication systems a communications signal modulates a device such as a light emitting diode or semiconductor laser coupled to a thread-like optical fiber transmission medium which may be of the order of kilometers in length. At the other end of the optical fiber an optical receiver including a photodiode and amplifier apparatus is provided to retrieve the signal information.

Such a prior art optical fiber communications system suffers from the disadvantage that it can be readily tapped in analogy with wiretapping. For example, an unauthorized person can mechanically introduce ripples or bends in an intermediate section of the optical fiber, place an optical coupling medium around the fiber and locate a photodetector to receive a tiny portion of the light carrying the transmitted information, thereby achieving an optical tap. It is apparent that such a communications system is not fully advantageous for many applications requiring a high degree of communications security.

Likewise, a variety of optical systems utilizing nonmicroscopic beams of light and beams of light in the open air suffer from similar forms of insecurity and additional problems of inconvenience and limitations on rate of communication.

Accordingly, it is an object of the present invention to provide a method and system and optical communications components therefor to overcome the tappability and other problems in prior art optical communications systems.

The problem of rendering communications more secure is one which characteristically does not admit of total solutions in that provisions for increased security in systems generally increase the cost and difficulty of unauthorized access but do not render it impossible. However, provisions for security can effectively preclude unauthorized receptions except by the most determined and well financed intruder.

Where the transmission system consists of a subscriber station at subscriber controlled premises, a transmission line, and a telephone company central office, the rational intruder will attempt to violate the security of the "weakest link" in the system. That is, the intruder can be expected to strike where a "perceived exposure" criterion, including financial expense and risk of detection factors, is least. When provisions for security are being made at the subscriber premises and the telephone company central office, it is not unreasonable to expect an intruder to attempt to violate the security of the transmission line. Thus, increasing the security of the transmission line can increase the security of the transmission system as a whole. Similar considerations apply where both ends of the transmission system are controlled by the same entity, of course.

Consequently, it is an object of the present invention to provide greater security for information transmitted in an optical fiber communication system by substantially increasing the cost, difficulty and risk of detection of unauthorized reception from an optical fiber transmission line used therein.

SUMMARY OF THE INVENTION

In the present invention a composite optical fiber dielectric waveguide for use in a transmitter-fiber-receiver system of the invention is provided which is capable of carrying two distinct optical signals in microscopic proximity instead of only one signal as in prior art systems. A secure optical signal is conveyed in a core in a suitably central optical waveguide portion in the composite waveguide. The central waveguide portion is physically surrounded by a high-loss or nontransmissive film such as metal or carbon which substantially reduces or eliminates leakage from the secure signal core to the environment, even if the fiber has ripples or bends induced therein. Any residue of the secure signal which may penetrate the film is optically jammed by a guard signal carried in additional optical cores of the composite optical fiber exterior to the film. All of the cores are embedded in a matrix of cladding material of lower refractive index which also holds the nontransmissive film.

The technique or method practiced is such as to achieve the result that light cannot escape from the secure channel without being jammed by the guard signal, thereby defeating conventional optical taps. Furthermore, the guard signal light hardly penetrates the nontransmissive film, so that there is negligible interference to the secure channel and no need for expensive electronic equipment for somehow separating the guard signal from the secure signal at a receiving end. The financial expense and difficulty involved in attempting some tapping scheme other than the conventional optical taps, if such a scheme can be discovered, is sharply increased. Successful physical tampering is made very difficult by virtue of the microscopic cross-section of and minute index differences in the fiber. Moreover, the guard signal makes possible the further additional advantage that it can be monitored at the receiving end, thereby sharply increasing the intruder's risk of detection before he can gain access to the secure core, consequently increasing the degree of system security.

In order to take advantage of the potential for increased security in providing a guard signal in the guard cores, the invention also includes novel optical transmitter and monitoring receiver equipment in a system for sending and receiving related optical guard and secure signals. The signals may advantageously have a pulse code modulated (PCM) format including bits, called security bits, correlated in a prearranged way. For example, one form of the inventive optical transmitter is a PCM circuit operating at a suitably rapid data rate and driving a light emitting device coupled to the secure fiber channel, the transmitter further having a guard section including a second pulse generator, such as a random PCM pulse generator synchronized with a common transmitter clock, driving one or more second light emitting devices coupled to the guard core or cores of the fiber previously described. The second pulse generator output is repetitively occasionally gated into the secure channel to form the abovementioned correlated security bits. Likewise some time slots in the secure channel are deliberately repetitively left devoid of energy so that any unexpected crosstalking into the secure channel is a sign of tampering or malfunction.

Corresponding to the transmitter is an optical receiver according to the invention which includes a secure information receiver section coupled to the central core, and a guard signal receiver section coupled to the guard core or cores. The secure information receiver section reproduces the secure information and delivers it to an output while at the same time cooperating with the guard signal receiver section to check for signs of tampering or malfunction. For example, one form of the inventive receiver is a PCM receiver with a comparator device fed by the guard and secure receiver sections for detecting the transmitted security bits and checking for the correlation relationship. If the correlation is not found, a warning is generated as an indication of tampering or malfunction and used either to set off a local alarm or to send back a warning to the source of the transmission. Likewise, guard signal amplitude and crosstalk monitoring circuits are advantageously providable in receiver embodiments of the invention.

The invention is suitable for use in one-way or two-way communications systems. Where, for instance, it is desired to provide a two-way secure path to a telephone central office or other destination from a subscriber terminal, such as a telephone, teletypewriter, facsimile machine, video terminal, and the like, the invention can take the form of a composite fiber link pair coupled to communications interface units at each end. The interface units each include a transmitter, a receiver, and a line circuit combined according to the invention. In this manner, convenient and secure telecommunication by optical fiber means is accomplished at any desired information rate.

DETAILED DESCRIPTION OF THE DRAWING

Figures 1, 2:
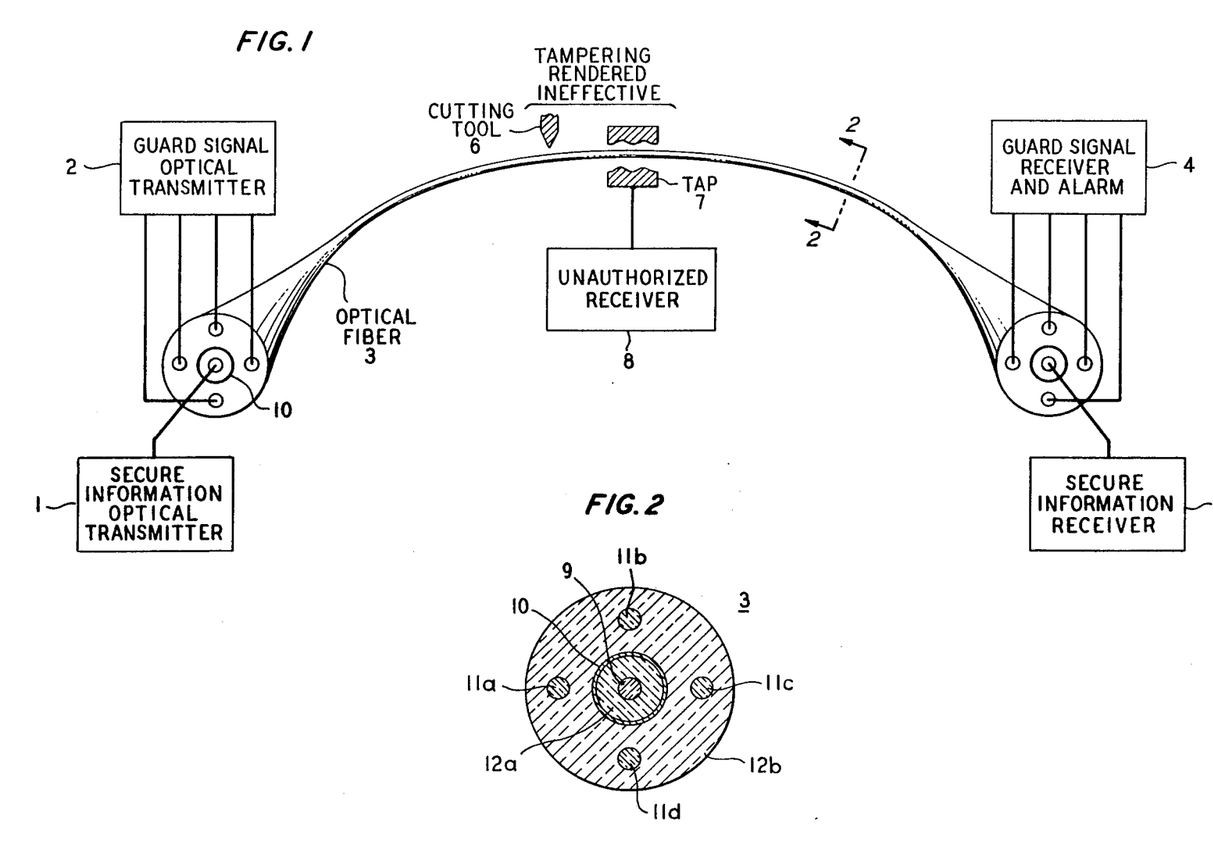
FIG. 1 is a partially pictorial, partially block diagram of a secure optical fiber communications system according to the invention.
FIG. 2 is a transverse cross-section of a composite optical fiber transmission line according to the invention.

In FIG. 1 an optical transmitter 1 capable of sending secure optical signal information is optically coupled, or connected, to a central core 9 of composite optical fiber transmission line 3 which in turn carries the secure optical signal and is optically coupled, or connected, to an optical receiver 5 of the secure information at the other end of fiber 3. A guard signal optical transmitter 2 capable of jamming at least a leakage portion of the secure information signal is coupled to one or more additional exterior cores 11a-11d in the composite optical fiber 3. The guard signal passes and is conveyed through the additional guard cores to the other end of the optical fiber and is received at a guard signal receiver 4. Optically lossy, opaque, or nontransmissive material 10 such as a metal or carbon cylindrical shell or film surrounds the central core all along its length and prevents escape of light therefrom and is located between the central core and the guard cores. The shell 10 optically isolates or separates the central core at the transmitter wavelength or wavelengths from the surrounding environment exterior to the shell, the surroundings including the exterior guard core or cores, and the wavelengths of the light being in the infrared, visible, or ultraviolet regions of the optical spectrum.

Guard signal receiver 4 coupled to each core 11a-d monitors the guard signal from guard transmitter 2 for departures from the expected amplitude or other characteristics so as to detect signs of tampering or malfunction and to provide a warning when such signs appear. It will be noted that the guard signal is distinct from the secure signal and monitoring of the guard signal can take place in a separate receiver or receiver section 4. The result of this novel optical fiber and communications system configuration is that if tap 7 be used to induce ripples or bends in optical fiber 3, an unauthorized receiver 8 will merely receive the signal from guard transmitter 2 jamming any leakage of the secure information to be protected from receiver 8. Attempts to violate the physical integrity of optical fiber 3, such as by means of a cutting tool 6 to interrupt the guard signal and cut through the film 10, are psychologically deterred by the possibility of system monitoring or when in fact attempted, are readily detected by the guard signal monitoring receiver 4. An alarm or warning is in that event suitably set off at the receiver 4 or communicated back to the source of the secure information to interrupt transmission and prevent compromise of the security of the information.

In FIG. 2 the cross-sectional structure of the composite optical fiber transmission line 3 is shown in greater detail. Cores 9, 11a, 11b, 11c, and 11d are encased or embedded in a cladding matrix 12 including portions 12a and 12b which also holds film 10. Secure information passes along a highly transmissive light path in central core 9 having a refractive index at the wavelength of transmission which sufficiently exceeds that of the glass or other cladding material in cladding matrix part 12a so that light propagates through the core 9 with low loss by the well known phenomenon of total internal reflection.

Surrounding the cladding 12a and core 9 embedded therein is a film or layer of material 10 having the form of a cylindrical shell so as to block (as, for example, by reflection or absorption) light incident upon the inner or outer surface thereof, essentially shield or block transmission through itself at the wavelength or wavelengths of interest, and isolate the light paths for the secure signal and guard signal from each other without isolating the guard signal paths from the environment. The lossy film 10 is surrounded by a cladding matrix part 12b suitably similar to the inner cladding matrix part 12a which the film in turn surrounds.

At least one and suitably a plurality of additional light paths are formed in higher index optically transmissive guard cores 11a, 11b, 11c, and 11d, which are embedded in the relatively lower index cladding 12b. The guard cores 11a–11d are embedded in the glass 12b in fixed locations relative to the central core 9 with respect to which the guard cores 11a–11d are microscopically proximate. The film 10 surrounds all of the central core 9 but not the guard cores 11a–11d so as to provide the differential shielding as above described which is an important feature of the invention. The signals as conveyed are constrained to follow microscopically proximate paths in a substance, herein glass, of substantially uniform composition, as far as mechanical and chemical attack are concerned, so as to prevent mechanical separation, deliberate or otherwise, of the paths. In this way, the signals are not only constrained but also simultaneously mechanically protected from lateral separation that would permit access involving tapping one signal and not the other.

Illustrative fiber dimensions suitably involve cores which are 2 mils in diameter and separations of each core from other interfaces of 1 mil, for a total composite diameter of about 12 mils for fiber 3. The thickness of layer 10 is suitably a fraction of a micron, or such other thickness as will substantially reduce transmission through the layer (60dB being suitable) given the layer substance selected for use in the fiber.

The cross-sectional structure of fiber 3 shown in FIG. 2 permits secure optical signal light to be substantially confined within the waveguiding region including core 9 and cladding 12a or absorbed by layer 10 even when the optical fiber is bent in a manner suitable for tapping ordinary optical fibers. At the same time the optical isolation between the guard cores 11a–11d and central core 9 is maintained all along the length of the central core so that the secure and guard signals can be received separately at a suitable receiving location, and escape or exchange of light from or between the central core 9 and guard cores 11a–11d through the nontransmissive barrier, shell, or film 10 is essentially blocked and prevented.

Optical fiber 3 is suitably manufactured by a technique of pulling the fiber from a heated composite preform of glass having a cross section similar to that shown in FIG. 2 but of magnified scale. The glass preform is heated to a suitable glass softening temperature and metal particles such as of tin or lead, a low melting point alloy or other suitable substance which is nontransmissive at the operating wavelength, are previously introduced into a space between the cladding preform portions corresponding to parts 12a and 12b. Since the melting point of the metal is preferably at a temperature lower than or equal to the softening point of the glass preform, the metal soon assumes a molten or liquid form. Then when one end of the preform is pulled or drawn down to produce the optical fiber 3, the liquid metal is drawn along in the space in the cladding matrix 12 and held so as to solidify as an unbroken cylindrical shell 10.

The optical fiber 3 is readily jacketed and cabled by standard techniques. Breaking the fiber and preparing fiber ends satisfactory for optical splicing are suitably accomplished by any standard technique such as one involving scoring, tensioning, bending, and breaking, or by grinding and polishing methods, or still other end preparation methods known to the art.

Figure 3:
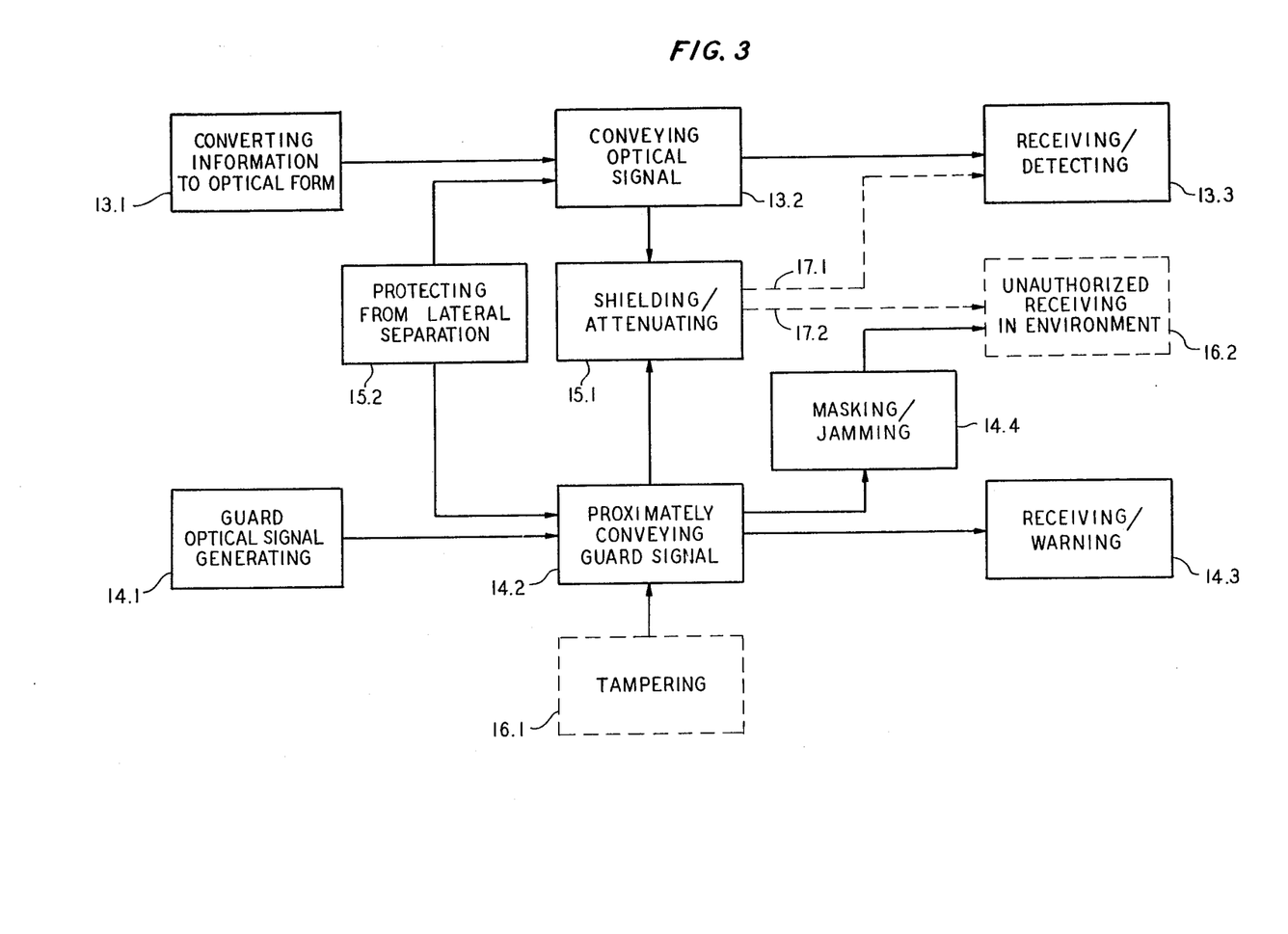
FIG. 3 is a flow diagram of steps performed by the system of the invention according to the inventive method to defeat tampering and unauthorized receiving.

The flow diagram of FIG. 3 illustrates the inventive method for rendering optical communication more secure, which is advantageously utilized in optical communications systems according to the present invention. A stream of desired information to be communicated is converted in step 13.1 to optical signal form, such as by amplitude, phase, or digital forms of modulation. The optical signal is next conveyed in step 13.2 from its source location along a length to a destination where it is received and suitably detected in step 13.3.

At the same time, an optical guard signal similar to the desired signal is generated in step 14.1, proximately conveyed leakingly in step 14.2 relative to the optical signal conveyed in step 13.2, and received in step 14.3. Simultaneously with the above-mentioned steps or operations, the desired optical signal and the guard signal are protected in step 15.2 from deliberate lateral separation which would disturb or destroy the proximate relationship and permit access to the desired signal without interruption of or effect on the guard signal.

Meanwhile, there is occurring in step 15.1 a shielding or attenuating of the desired signal and guard signal relative to each other and a shielding or attenuating of the desired signal relative to the environment as well. Since some leakage from the light paths in an optical system by mode conversion, scattering and other mechanisms is an inevitable practical consequence of optical transmission, the shielding step 15.1 attenuates the desired optical information stream relative to the environment, as indicated by broken line 17.2 so that the proximate leakage of the guard signal results in jamming 14.4 or masking the attenuated leakage 17.2 of the desired information stream relative to the environment. Consequently, unauthorized receiving 16.2 in the environment is thwarted. Simultaneously, the shielding/attenuating function works to prevent combining of the guard signal and desired signal, thereby to substantially isolate the guard signal being conveyed at step 14.2 from becoming subject to the detecting function 13.3 as indicated by the broken line 17.1.

If tampering 16.1 be attempted on the conveying processes 13.2 and 14.2, a modification of the guard signal conveying process 14.2 occurs due to the tampering 16.2 resulting in receiving in step 14.3 of a modified guard signal which activates a warning function. If unauthorized receiving 16.2 is being attempted in the environment, then regardless of whether a warning is produced at 14.3, the unauthorized receiving will be defeated because the guard signal performs a masking or jamming function 14.4 on leakage 17.2 of the desired optical signal by virtue of the shielding/attenuating process 15.1 performed on the desired optical signal. Thus, the invention offers a security advantage in that an intruder can only receive the guard signal without detection at levels below the warning threshold, in which case the desired signal is masked, and if he tries to gain access to the desired signal he necessarily sets off the warning which frustrates the opportunity.

Indeed, the method of the invention provides at least five advantageous features. First, it provides for conveying a desired optical signal and a guard optical signal in microscopically proximate relationship, making access to one signal and not the other exceedingly difficult. Second, it mechanically protects the guard signal and desired signal in the process of being conveyed from being laterally separated so that the microscopically proximate relationship would be destroyed. Third, the desired signal is shielded from the environment, including any area where a guard signal is being conveyed, thereby isolating the desired optical signal in its own path from interference by the guard signal. Fourth, leakage of the desired optical signal is attenuated on its way to the environment to such an extent that guard signal leakage to the environment effectively masks or jams it. Fifth, the guard signal is receivable and analyzable separately from the desired optical signal so that tampering performed on the inventive method is readily detected without compromising of the security of the desired information.

Figure 4:
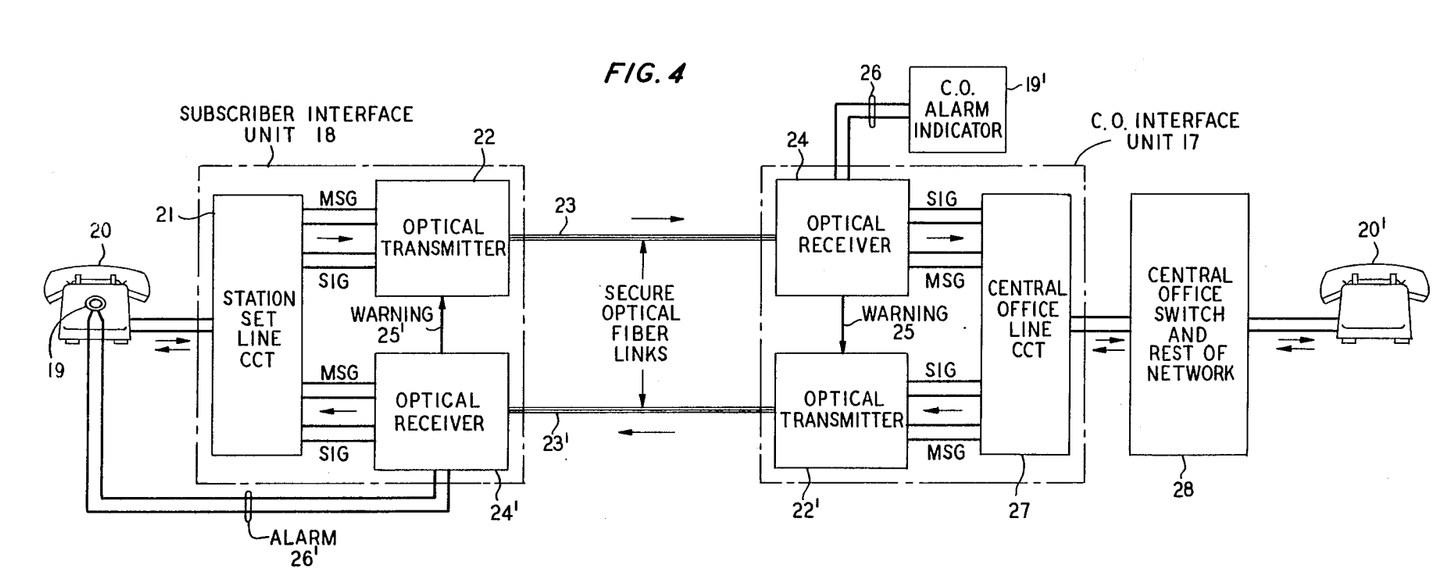
FIG. 4 is a block diagram of a two-way secure optical fiber communications system including interface units according to the invention at two locations, the system linking two telephones and providing alarm indications in case of compromise of system security.

The block diagram of FIG. 4 shows a system according to the invention providing two-way secure communications between two secure telephones 20 and 20'. The use of telephones is purely illustrative, of course, and any communications terminals or other sources of secure information may suitably be used in or adapted to the present system. It is assumed that unauthorized parties are denied access to the system hardware at either end of optical fiber links 23 and 23' but that the fiber links themselves are subject to tampering.

The system illustrated in FIG. 4 may be called a secure subscriber loop optical communications system. Subscriber telephone station set 20 is capable of sending outgoing message and signaling information and receiving incoming message and signaling information by means of subscriber interface unit 18. Interface unit 18 has an alarm pair 26' connected to a subscriber system security status indicator lamp or other alarm indicator 19 shown conveniently mounted on the secure telephone station set 20.

Interface unit 18 includes a subscriber optical transmitter 22 having a message input (MSG), a signaling input (SIG) and a central office warning input for warning line 25'; and transmitter 22 also has a secure optical output incorporating the outgoing message, signaling, and warning information and feeding it to secure optical fiber link 23 at a central secure core thereof. In addition, the transmitter 22 also provides a guard optical output to the guard cores of the fiber of fiber link 23 so that any leakage of the secure output will be masked and thereby protected.

Interface unit 18 also includes a subscriber optical receiver 24' having a secure optical input for incoming information on secure optical fiber link 23'. The receiver 24' also has an optical guard signal input for monitoring the guard cores of link 23'. The receiver 24' decodes and recovers the secure information from fiber link 23 and produces a message output (MSG), a signaling output (SIG), a subscriber alarm output to alarm pair 26' and a decoded central office warning output communicating as warning 25' to the previously mentioned central office warning input of the subscriber optical transmitter 22.

Interface unit 18 additionally includes an apparatus 21 known as a station set line circuit for coupling or interconnecting station set 20 with optical transmitter 22 and optical receiver 24'. Line circuit 21 routes outgoing message and signaling information from the line from the subscriber telephone station set, which may be an ordinary "500" type telephone set, to the MSG and SIG inputs of the subscriber optical transmitter 22. It also routes incoming message and signaling information produced at the MSG and SIG outputs of optical receiver 24' so that these are appropriately passed to the telephone station set 20 without any disadvantageous interference to the outgoing information.

From the point of view of the subscriber user, the apparatus of the invention provides a pair of optical fibers terminating at the subscriber premises and being connected to an interface unit 18, which may be located in any convenient and safe place. Wire pairs including the telephone line and alarm pair 26' pass to the secure station set 20 for use at a desk or other suitable location. When station set 20 is a telephone, the user operates the telephone to originate and receive calls with the convenience of any ordinary telephone. An indication of system security is always available via indicator 19 on the telephone, and should the indicator 19 signal a security alarm for any reason the user can immediately cease any confidential communications.

The user may not only enjoy secure conversational telephone service but also may take advantage of the capacity of the system to carry teletype information or facsimile communications which may be acoustically coupled to the telephone station set. It is contemplated that one form of the interface unit 18 of FIG. 4 can permit two-way communications having a bandwidth of four kilohertz (KHz) coded into 64 kilobit per second (Kbs.) pulse code modulated (PCM) transmissions for teletype and slow speed facsimile. The system in the same form can also advantageously permit high speed facsimile, computer, and other data transmissions at a 56 kilobit per second (Kbs.) rate when the appropriate terminals are hardwired to the interface unit 18 and suitably permitted to operate at high speed in synchronism with a system clock in unit 18. This means that the invention offers the customer not only substantially increased security features, but also capacity for relatively high speed data transmission in the same interface unit package. Moreover, there is no inherent bandwidth limitation in the services which can be offered by means of the invention itself. With an alternative high speed interface unit, interactive secure video communications are possible, according to the invention.

At a location remote from the subscriber premises the secure optical fiber pair 23 and 23' connect to another interface unit 17, which is for the purposes of the present description assumed to be located at a telephone company central office. Repeaters can be used in link 23 but they must be protected from tampering, and it is contemplated that the advantageously low losses now available in optical fiber technology can make repeaters unnecessary in the system, thereby reducing cost and increasing security. The interface unit 17 at the central office converts the two-way communications on the secure optical fiber links 23 and 23' to the appropriate form for two-way communication along a central office wire-pair to the central office switch and rest of the telephone network 28. Appropriate provisions for security are taken at the telephone central office, and the subscriber optical loop is monitored for any signs of tampering or system malfunction which are made available at central office alarm indicator 19' connected via alarm wire-pair 26 to the central office interface unit 17. With the system configured in this manner, the subscriber at his premises may make and receive calls from his station set 20 knowing that his connection to the central office is secure and that he can talk with any other telephone station set 20' or appropriate communications terminal connectable to the telephone network. It is to be expected that telephone calls from the subscriber secure telephone become lost for all practical security purposes in the central office and in the complexity of the rest of the network. Of course, if the destination of the secure communications is feared to be known to a potential intruder, the premises of the telephone 20' may be equipped with a similar secure optical fiber loop according to the invention and connected by means of additional secure optical fiber links to its own telephone central office, not shown in FIG. 4.

Central office interface unit 17 is now described in more detail. Unit 17 comprises a central office optical receiver 24 having a first optical input coupled from the secure core of link 23 and a guard signal optical input from guard cores of optical link 23. Optical receiver 24 decodes the secure information and produces a central office message output (MSG), a central office signaling output (SIG), an output on line 25 to warn the subscriber of any security status problems, and a central office alarm output connected to the alarm pair 26 and alarm indicator 19'.

The central office interface unit 17 also includes a central office optical transmitter 22' having a message input (MSG) from the central office switching machine, an input (SIG) for central office signaling information ultimately caused by telephone 20', and an input for the subscriber warning 25 which is communicated from the subscriber warning output of the previously mentioned central office optical receiver 24. Optical transmitter 22' in the central office interface unit 17 has two outputs—first, a secure optical output for the information which is to be ultimately incoming to telephone 20 and second, a guard optical output capable of masking leakage of the secure optical output by operation of the inventive technique in the optical fiber link 23'.

In order to interconnect the optical receiver 24 and optical transmitter 22' to the central office switch 28 there is provided a central office line apparatus or circuit 27. The line circuit 27 routes message and signaling information which is incoming relative to telephone 20 from the central office line to the central office message input (MSG) and central office signaling input (SIG) respectively of the central office optical transmitter 22'. Conversely, the central office message (MSG) and signaling (SIG) outputs from the central office optical receiver 24 carry information which is outgoing relative to telephone 20 to the central office line circuit 27, which in turn puts the information on the central office line to switch 28.

Optical fiber links 23 and 23' of FIG. 4 have a cross section including a secure central core and guard cores with the opaque film shown in FIG. 2. The central core and the guard core or cores of fiber link 23 connect the optical secure and guard outputs of transmitter 22 to the secure and guard optical inputs of optical receiver 24 respectively. Likewise, optical transmitter 22' and optical receiver 24' are linked in the manner just described by means of optical fiber 23'.

Considering the security aspects of the subscriber loop system of FIG. 4, it is readily observed that secure communications pass back and forth between terminals 20 and 20' through the optical fiber link pair 23 and 23'. If tampering be attempted on fiber link 23, optical receiver 24 detects a security problem and communicates a warning 25 along link 23' by means of transmitter 22' to the receiver 24' and ultimately to alarm indicator 19 at telephone 20. If optical receiver 24' also detects security problems on link 23', it uses optical transmitter 22 to communicate a warning 25' back to the central office receiver 24 for receiving the warning and triggering the alarm indicator 19'. If desired, the system is readily adapted for triggering both indicators 19 and 19' when either or both of warnings 25 and 25' are generated. Thus, the apparatus of FIG. 4 may be considered to represent a composite system for secure optical communication utilizing an optical communications system for transmitting secure information one way and a distinct optical communications system for communicating warnings of system compromise the other way, where each system part is an optical transmitter—optical link—optical reception system unit.

Figure 7:
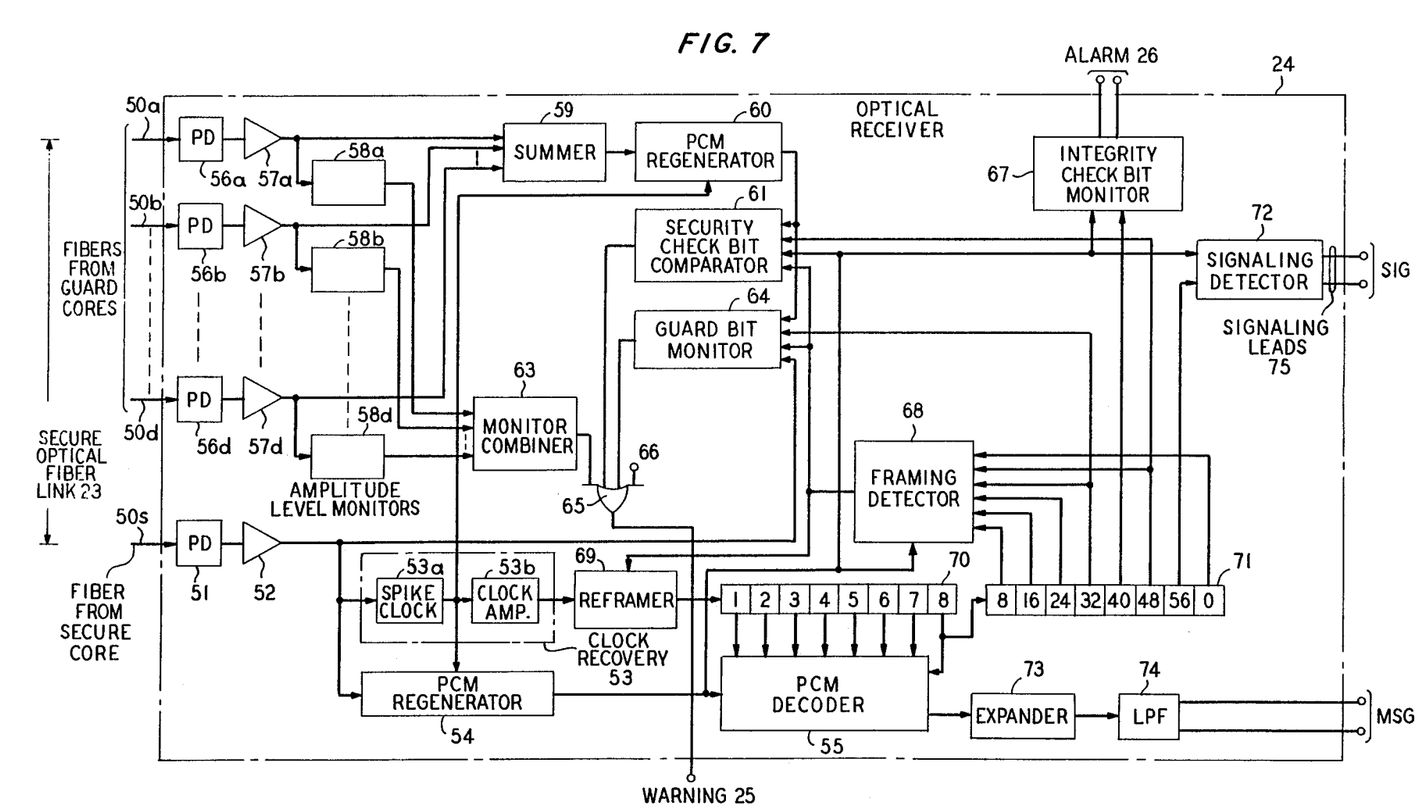
FIG. 7 is a block diagram of an optical receiver according to the invention for use in the interface unit at each location in the secure communications system of FIG. 4.

The composite system of FIG. 4 is implemented in its details in a manner suitable to the performance and economic requirements on it. An approach illustrated herein can utilize prior art technology such as that described in the following publications. "Optical T-Carrier Systems on Glass-Fiber Cable: A Promising New Technology" by J. Fulenwider et al., *Telephony* June 2, 1975, pages 34–37, 40, 42, and 48 discusses optical PCM carrier systems using glass fibers. "The T1 Carrier System" by K. E. Fultz et al., *Bell System Technical Journal* September 1965, pages 1405–1451 discusses the system design of an electrical PCM time division multiplex system showing some waveforms in FIG. 2 and a block diagram of the D1 channel bank group circuits in FIG. 3. "An Experimental Pulse Code Modulation System for Short-Haul Trunks" by C. G. Davis, *Bell System Technical Journal* January 1962, pages 1–24 and "A Bipolar Repeater for Pulse Code Modulation Signals," by J. S. Mayo, ibid., pages 25, 66, 67, and 84–87 describe some basic circuits for use in a PCM communications system. U.S. Pat. No. 2,984,706 issued May 16, 1961 to H. M. Jamison et al. discusses the insertion of framing information in pulse modulation systems. U.S. Pat. No. 3,083,267 issued Mar. 26, 1963 to D. C. Weller discusses means of transmitting telephone signaling information in PCM communications systems. Since such technology is familiar to those skilled in the art, it is considered sufficient to describe the preferred embodiments of the present invention in block diagram form so as to highlight the novel aspects of the system components more effectively. It should be noted at the outset that cost advantageous time division multiplexing a plural secure messages may be performed in interface units according to the invention, but the system embodiment disclosed in FIGS. 4, 5, and 7 shows the simpler case of a single channel PCM subscriber loop operating at a relatively low bit rate of 64 Kbs. as distinguished from some of the T1 and optical fiber T1 prior art hereinabove cited.

Figure 5:
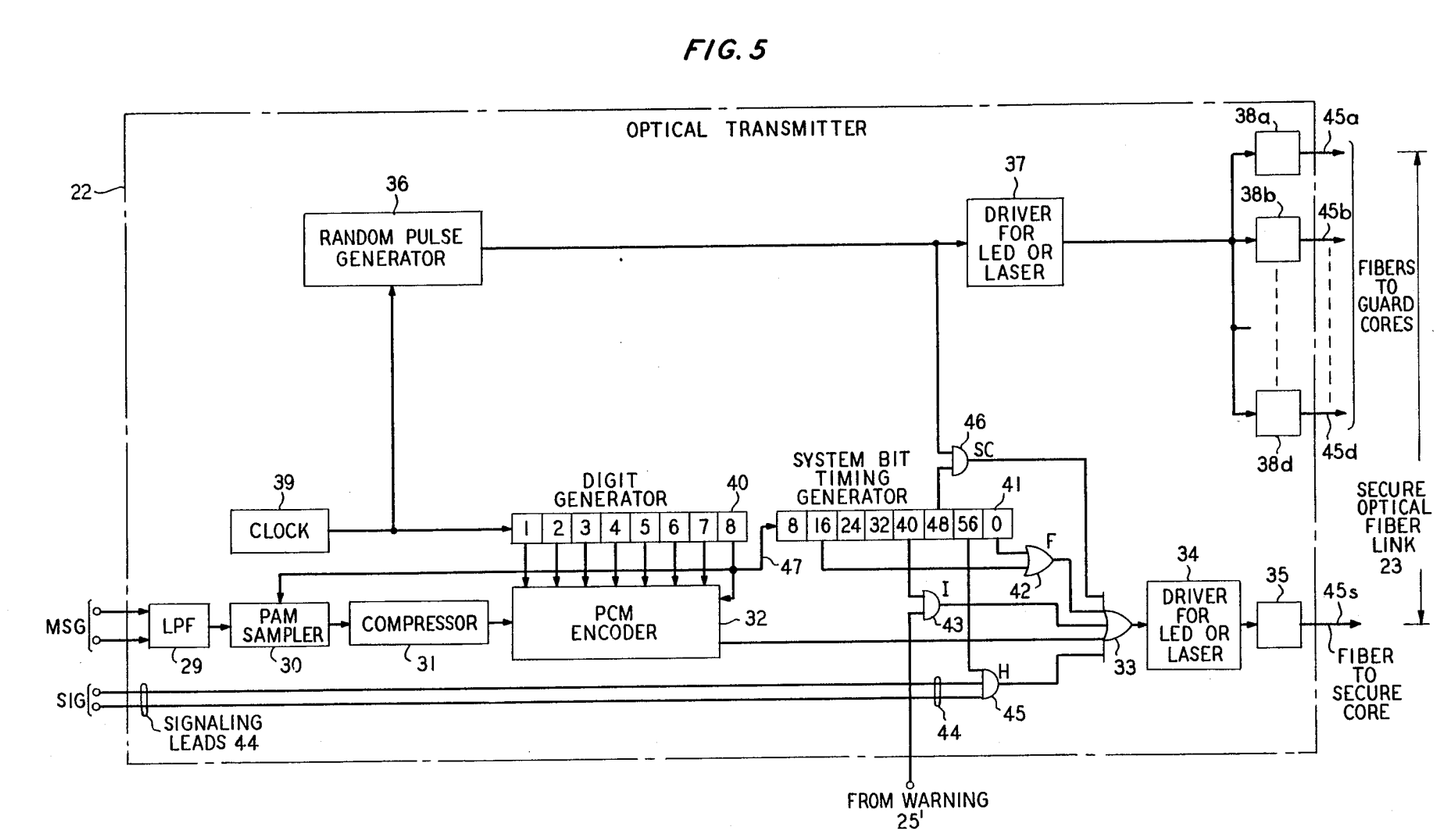
FIG. 5 is a block diagram of an optical transmitter according to the invention for use in the interface unit at each location in the secure communications system of FIG. 4.

FIG. 5 shows the block diagram of an optical transmitter for use as the transmitter 22 and the transmitter 22' of FIG. 4. Transmitter 22 is described for illustration, it being understood that transmitter 22' has an analogous block diagram wherein every number of the block diagram in FIG. 5 is primed.

Analog communications message input (MSG) information delivered for transmission by optical transmitter 22 is confined illustratively to a 3.8 KHz bandwidth by low-pass filter (LPF) 29 and then sampled by a pulse amplitude modulation (PAM) sampler 30 at a sampling rate suitably at least twice the highest frequency component of the filter output, herein 8 Kbs. Sampler 30 is driven by a pulse having an 8 Kbs. rate and approximately an eight microsecond pulse width. The sampler may be of any suitable type for making sampled analog amplitude levels available for a period of about 125 microseconds. In one sampler design shown in Davis FIG. 3, each amplitude sample is gated to a storage capacitor and subsequently clamped to zero. In the sampler of FIG. 5 using 8 Kbs. pulses, the clamping is suitably accomplished by the leading edge of the 8 microsecond pulse and the gating by the pulse itself delayed somewhat.

The 125 microsecond length analog levels are made available at the output of the PAM sampler 30 and pass through an amplitude compressor of well-known type for reducing quantizing noise by approximately producing an output proportional to the compressor input in decibels (dB). The output of compressor 31 is fed to a PAM-to-PCM encoder 32 which produces message pulses in groups of seven, each pulse being about eight microseconds long and occupying a time slot about 16 microseconds long. Each group of seven pulses represents a binary representation of a single analog voltage level.

Clock 39 provides the time base for synchronizing the system by means of a continuous train of pulses eight microseconds long repeated at a 64 Kbs. rate, or about once every 16 microseconds. Clock 39 drives digit generator 40, which is essentially a ring counter composed of eight stages of any suitable type such as a chain of blocking oscillators serially responsive to clock 39 and having an inhibit bus as suggested in Davis FIG. 9 and Jamison. The outputs of the stages of digit generator 40 produce digit (D) pulses numbered 1-8, each pulse being of approximately eight microseconds length in a 16 microsecond time slot and repeated every 125 microseconds in staggered fashion. These pulses are denoted as D1, D2 . . . D8.

PCM encoder 32 is of any suitable type such as that of Davis FIG. 4. It is readily observed that the digit generator 40 synchronizes the PAM sampler 30 with encoder 32 by driving the sampler with D8 and driving the PCM encoder with digit pulses D1-D8. If time division multiplexing of plural secure messages be desired, this may be performed at PCM encoder 32 by using a higher system bit rate and gating in amplitude levels from the different channels to be multiplexed. Scrambling and/or some form of encryption, such as by use of a nonstandard PCM code or programably variable PCM code, may also be performed by a different or more complex encoder apparatus as a security feature.

Pulses D1-D7 are used to successively code each group of seven PCM message pulses in encoder 32, and D8 is used to reset both sampler 30 and encoder 32 and to prevent any output from encoder 32 during the 16 microsecond time slot of D8.

System bit timing generator 41 is driven by digit pulse D8 from digit generator 40 so as to identify distinct time slots D8, D16, D24, D32, D40, D48, D56 and D0 for use in timing various bits and empty time slots used by the system during the intervals when the encoder 32 is always off. System bit timing generator 41 is also a serially responsive ring counter like digit generator 40 except that it operates to produce eight 8-microsecond length pulses at 1 Kbs. (⅛th the 8 Kbs. bit rate of digit generator 40) staggered at 125 microsecond intervals in a frame length of 1000 microseconds. A 1-0-1-0-0 sequence of system framing pulses is provided in every 1000 microsecond frame by pulses D0, D8, D16, D24, and D32 respectively. The one pulses of D0 and D16 are gated by framing OR-gate 42 into secure signal combining OR-gate 33 along with the output of PCM encoder 32.

Warning 25, which is usually zero, but can be a one for long periods when a warning condition is on, is coded and inserted into the secure signal by means of integrity-bit-producing AND-gate 43 which ANDs warning 25 with pulse D40 and inserts the product into the signal by means of OR-gate 33. Signaling information (SIG) appearing as a short or an open circuit on signaling leads 44 passes to signaling AND-gate 45 which produces a one in time slot 56 if signaling leads 44 are shorted, otherwise, a zero.

The circuitry that has just been described represents means of producing an electrical secure signal, the secure signal having a PCM format including the secure message (M), framing (F), warning (integrity) (I), and signaling (H) bits. In addition to the electrical secure signal the invention advantageously provides means of producing an electrical guard signal including nonsecure PCM jamming bits corresponding in time to the PCM bits in the secure channel. One design approach to this aspect of the invention is shown in FIG. 5 wherein clock 39 drives a random pulse generator 36, the output of which is the electrical guard signal. Random pulse generator 36 may be of any suitable type such as a random noise generator driving a bistable multivibrator which is clocked by clock 39. The output of the bistable multivibrator should consist of random pulses which are of substantially identical pulse length and timing as the pulses in the electrical secure signal and occupy identical time slots.

If desired, the guard signal could be PCM or other communications information of a type the security of which is unimportant. In all cases the optical transmitter electronics is amenable to construction in discrete components, integrated circuits corresponding to the main functional blocks, or by fabrication on a single chip utilizing the technology of large scale integration (LSI).

In an important feature of the invention, means are provided for producing a security check bit in the electrical secure signal which is correlated with a bit in a time slot of the electrical guard signal. The electronics for producing the electrical secure signal is made responsive to a bit in the guard signal so as to insert in a correlated manner, a security check bit in the secure signal corresponding to the bit in the guard signal. In this way the bits in both the guard signal and the secure signal are produced cooperatively and are called security check bits. The related bits permit a comparison of the optical secure and guard signals to yield evidence of the expected relationship, or lack thereof, at the receiving end.

FIG. 5 shows one way of accomplishing a security check bit correlation whereby in the specific time slot 48 the secure channel always carries a bit which is identical to the random bit produced in time slot 48 by random pulse generator 36 in response to clock 39. In this way transmitter 22 repetitively provides substantially synchronized pulses in both the secure and guard channels having a relationship of simultaneous presence or absence permitting a comparison for the simultaneous presence or absence at the receiver. Security check (SC) AND-gate 46 produces a zero at all times except during time slot 48 when it permits a security check bit in the electrical guard signal to pass to OR-gate 33 and be inserted in the electrical secure signal. A security advantage in the use of random pulse generator 36 is that the security check bit itself is random and hence unpredictable by an intruder since it is unpredictable by the secure user as well. It may readily be seen that an inverter could also be placed either in the guard signal input to AND-gate 46 or in the output of AND-gate 46 for producing a security check bit in the secure channel correlated with but opposite in character in the relationship of simultaneous presence and absence to the security check bit in the guard channel.

In response to the combined PCM electrical secure signal output of OR-gate 33, a driver circuit 34 electrically modulates or drives a suitable optoelectronic emitter device such as LED or laser 35, which is in turn coupled to fiber 45s and then to composite optical fiber 3 of FIG. 8 (to be more fully described hereinafter) so that the PCM signal is introduced into the secure core 9 thereof. Guard cores 11a–11d are similarly coupled by means of fibers 45a, 45b, 45c and 45d to guard signal optoelectronic emitter devices, such as light emitting diodes or lasers 38a–38d, which are in turn electrically driven by driver circuit 37 in order to introduce the electrical guard signal into the guard cores of fiber 3.

Figure 6:
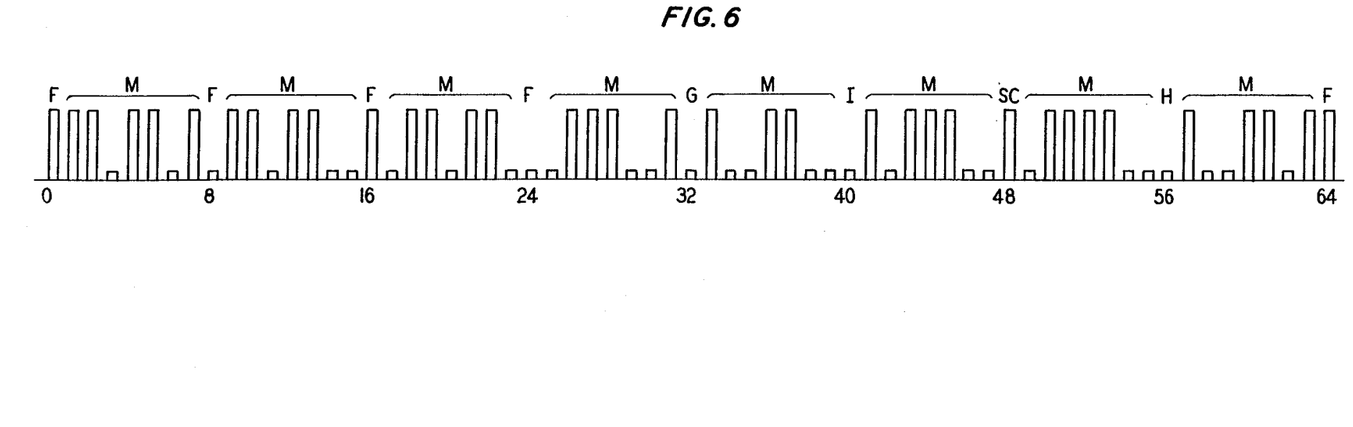
FIG. 6 is a graphical (intensity versus time) illustration of the format of a digital optical signal suitable for use in the system of FIG. 4.

FIG. 6 shows an illustrative pulse code modulation (PCM) signal format suitable for use with and which is employed by the transmitter 22 and receiver 24. The format can be fixed as illustrated herein or be programably changeable as an additional security feature. The pulse code modulated (PCM) signal is a sequence of binary pulses of light energy which are suitably denoted by one (1) if substantial pulse energy is present in a given time slot and otherwise denoted by zero (0). In FIG. 6 a one is indicated by a pulse of full height. Zero is indicated by a pulse of slightly nonzero height for clarity in showing relative timing of the ones only. Ordinarily no light is sent during a zero and only a slight amount of optical noise reaches the receiver 24 except during a security problem condition.

The format is of time-periodic or repetitive nature and is composed of preset or prearranged times or time slots 0–63, the time slot 64 corresponding to slot zero again. Every eighth bit is related to system information and does not include communications message information. Communications message information occurs in 7-bit sequences for encoding the positive and negative amplitude levels of the pulse amplitude modulated samples produced by PAM sampler 31. Thus, the encoded message levels are included in time slots 1-7, 9-15, 17-23, 25-31, 33-39, 41-47, 49-55, and 57-63.

The system information is included in bits in time slots 0, 8, 16, 24, 32, 40, 48, and 56. Identification of the time slots is made possible by the use of a prearranged repetitive framing bit sequence 1-0-1-0-0 at slots 0, 8, 16, 24, and 32, the framing bits being denoted by F in FIG. 6 except for bit 32. On-hook-off-hook signaling information from the secure telephone 20 is included as signaling bit 56 denoted by H. System security bits are provided by the use of guard bit slot 32 denoted by G, integrity bit slot 40 denoted by I, and security check bit slot 48 denoted by SC. It will be noted that time slot 32 serves a dual role in the system for framing and guard bit checking.

In the secure core and guard cores security check bit gate 46 of FIG. 5 produces a random sequence of one and zero bits appearing in time slot 48 of FIG. 6 and being by prearrangement identical in the cores due to the circuit arrangement of FIG. 5. The bits in each channel and core are synchronized by clock 39 for convenient comparison in the receiver. The purpose of the correlation just described is to make possible the detection of any tapping that affects the guard cores differently from the secure cores. Thus, by including the security check bit gate 46, the secure signal and guard signal portions of the optical transmitter or transmitters are permitted to cooperate so as to send respective optical signals of a type permitting comparison in specific time slots of the signals to yield evidence of the cooperation or correlation introduced.

Figure 8:
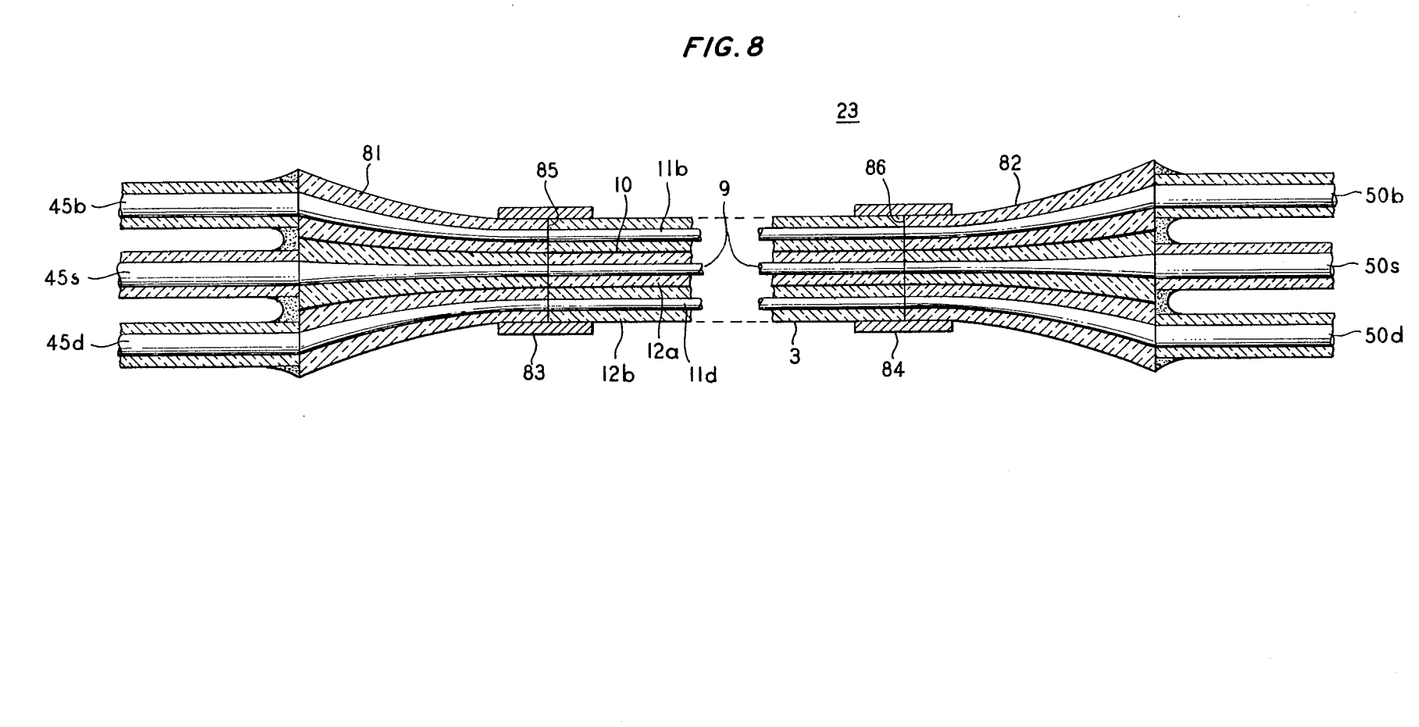
FIG. 8 is a longitudinal cross-section of an optical fiber transmission structure according to the invention having the transverse cross-section of FIG. 2 and being suitable for linking each optical transmitter of the type of FIG. 5 with each optical receiver of the type of FIG. 7 in the secure communications system of FIG. 4.

Random pulse generator 36 of FIG. 5 produces guard pulses randomly at time slot 32 of FIG. 6 in the guard cores 11 of the fiber of FIGS. 2 and 8. A zero is inserted in the secure core 9, that is, no light energy is transmitted into the secure core by emitter 35 during time slot 32. The use of a guard bit, of either random or continuous type in the guard channel, at time slot 32 makes possible the detection of any violation of the physical integrity of the lossy film 10 resulting in crosstalking from the guard cores 11 into the secure core 9. This is because the guard bit, even if only sometimes emitted, amounts to a tag pulse or tag component or identifier for the guard signal not found in the secure signal as transmitted. If the tag or identifier shows up in the secure signal receiver, an indication of system compromise is present, since the secure core transmitter sends no energy at the preset times of the guard bit.

FIG. 7 shows a block diagram of an optical PCM receiver 24 or 24' which is connected to the secure optical fiber link 23 or 23' of FIG. 4. The receiver provides optical reception capabilities for separately receiving the different optical signals sent through the optical fiber lines through the central and guard cores. A fiber 50s conveys light from the secure core 9 to FIG. 2 to photodetector 51 which in turn converts the secure optical signal to obtain the secure signal in electrical form, as a bit stream of digital electrical communications information which is amplified by preamplifier 52.

Clock recovery circuit 53 processes the output of preamplifier 52 so as to produce a spike clock output from circuit portion 53a to identify the exact timing of the pulses which are to be regenerated. Square pulses of eight microseconds length and 64 Kbs. repetition rate are made available at the output of circuit portion 53b called a clock amplifier. See for instance, Mayo, above cited at pages 84–87 and FIG. 52.

PCM regenerator 54, which may be of any suitable type such as that of Mayo, pages 66 and 67, reconstructs the raw preamplified pulses and delivers them to PCM decoder 55, framing detector 68, security check bit comparator 61, integrity check bit monitor 67, and signaling detector 72 to be further described. The output of PCM regenerator 54 is denoted by S, which is the secure signal as a function of time. S is composed of eight microseconds length pulses, which may be one or zero, in 16 microsecond time slots. $\overline{S}$ is used herein to designate the Boolean inverse (or NOT) of S.

PCM decoder 55, which may of any suitable type such as that shown at Davis FIG. 5, reproduces PAM analog levels from the PCM regenerator output in response to the time slot pulses D1-D8. The PAM output of decoder 55 is passed through an expander 73 to convert the received levels which are proportional to dB to the original voltage levels that existed prior to amplitude compression in the transmitter. A PAM demodulator such as low pass filter (LPF) 74 reproduces the baseband secure communications signal and delivers it to the receiver message (MSG) output to be available to a line circuit or other apparatus.

When the system is "in frame," that is, synchronized with the transmitter, clock pulses from circuit portion 53b of clock recovery circuit 53 pass unchanged through reframer circuit 69 and on to digit generator 70, which is a ring counter suitably identical to that utilized in the optical transmitter 22. PCM decoder 55 is operated with digit pulses D1-D8 of generator 70 so that each output analog level from decoder 55 is generated from regenerator 54 pulses in time slots D1-D7, the pulse D8 being used for resetting the decoder. Accordingly, decoder 55 ignores the regenerator 54 output in every eighth time slot. Pulse D8 of generator 70 is also used to drive system bit timing generator 71 so as to permit receiver identification of the pulses D8, D16, D24, D32, D40, D48, D56 and D0. Framing is established by framing detector 68 which determines whether the system is in frame (corresponding to a detector 68 output of zero) or out of frame (detector 68 output of one). If the system is out of frame, reframer 69 prevents a pulse from clock recovery circuit 53 from reaching digit generator 70 and framing is rechecked. If the system is still out of frame the process is repeated until the system is in frame and time slot identification is thereby successfully achieved.

Framing detector 68 is of any suitable type such as a logic and summing circuit checking each 1000 microsecond frame so as to implement the function $$\text{OUT OF FRAME} = \text{IF}(\bar{S} \circ D0 + S \circ \overline{D8} + \bar{S} \circ D16 + S \circ D24 + S \circ D32 > 1 - .5) \text{ THEN 1 ELSE 0,} \quad (1)$$

where " $\circ$ " is the Boolean AND. The circuit operates according to the equation above so that if the system is in frame $\bar{S} \circ D0$, $S \circ D8$, $\bar{S} \circ D16$, $S \circ D24$, and $S \circ D32$ are all equal to zero. Thus, the analog sum over a frame is equal to zero, which is less than the out-of-frame threshold. If the system is out of frame, the sum over a frame can be expected to exceed the threshold, which is set at any suitable level such as 1.5 incorrect pulses. A suitable integrator circuit may be used to accomplish the summation and can be reset by a digit pulse such as D48 as shown in FIG. 7 or can reset itself to check framing in subsequent frames.

Reframer 69 is of any suitable type for either preventing a clock pulse or adding an extra clock pulse when the system is out of frame. One suitable approach is to trigger a blocking oscillator when the framing detector output is a one so that the blocking oscillator produces a single pulse which may be of either a length sufficient to stop or inhibit a clock pulse from the clock recovery circuit 53 by means of a suitable logic gate or be short enough to be inserted as an extra clock pulse.

Signaling detector 72 is of any suitable type such as that disclosed in the Weller reference hereinabove cited. For instance, signaling detector 72 can be a gate for AND-ing secure signal S with time slot pulse D56, followed by an integrator driving a relay which has contacts which close and remain closed so long as the received secure signal S in time slot 56 is a one. When bit 56 in the secure signal is zero for a few frames, then the relay opens and the signaling leads (SIG) 75 are open circuited.

Integrity check bit monitor 67 produces an alarm 26 by generating a one voltage when the received integrity bits in time slot 40 are one or change to one in response to the warning signal 25'. Integration may be used to prevent noise or out-of-frame conditions from triggering the alarm voltage. Monitor 67 suitably includes a gate for AND-ing secure signal S with time slot pulse D40 followed by integration and alarm threshold triggering circuits.

The PCM guard optical signals conveyed by the guard cores 11a, 11b, 11c, and 11d are coupled to individual fibers 50a, 50b, 50c, and 50d which in turn are coupled to photodetectors 56a, 56b, 56c, and 56d which convert the electrical guard signals to obtain raw electrical guard channel bit stream outputs which are amplified in preamplifiers 57a, 57b, 57c, and 57d. The amplitude levels from each core are monitored for departures of the amplitudes from their expected levels or for other changes or signs indicative of tampering or malfunction, the monitoring being accomplished by amplitude level monitors 58a, 58b, 58c, and 58d. The use of several level monitors has the advantage of making it extremely difficult for an intruder to externally introduce a bogus guard signal without upsetting at least one level. When such changes in amplitude levels occur and are detected, a one pulse appears at an output of at least one of the level monitors which passes to monitor combiner circuit 63 which produces a long duration warning pulse to OR-gate 65 which in turn passes the pulse on as warning 25. Amplitude level detectors 58a-58d may be of any suitable type such as (a) a peak detector, such as a series diode followed by a slightly lossy shunt capacitor, followed by (b) a differentiator, such as a series capacitor followed by a shunt resistor, followed by (c) a trigger circuit or "window" detector which produces a one when any changes in the pulse peaks exceed predetermined limits.

The time constant of the peak detector in this arrangement is preferably long compared to the duration of any sequence of consecutive zeros which has a reasonable probability of occurrence in the random bit stream of the guard signal but short compared to the time which might be required to cut off the transmitted guard signal and introduce a bogus guard signal. Monitor combiner 63 is suitably an OR-gate connected to the outputs of the amplitude level monitors 58a-58d with the OR-ed output being used to turn on a trigger circuit or feed an integrator to drive OR-gate 65 with the long duration warning pulse.

The raw preamplified outputs of preamplifiers 57a-57d are summed in summer circuit 59 and delivered to a PCM regenerator 60 which regenerates the combined guard signal energy into reconstructed pulses timed by means of the spike clock output from portion 53a of clock recovery circuit 53. The output of PCM regenerator 60 is a good replica of the electrical guard signal generated by transmitter 22 unless there is tampering or malfunctioning in the system.

In an important feature of the invention, there is provided in each receiver a security check bit comparator 61 which utilizes inputs from PCM regenerator 60, secure signal S from regenerator 54, framing information from framing detector 68, and the system bit D48 from system bit timing generator 71. The purpose of the security check bit comparator is to receive the guard security check bit in the specific time slot 48 and compare it with the security check bit in the specific time slot 48 from the secure channel and to determine whether the prearranged relationship or correlation of the security bits is the same as transmitted. No problem is detected if the comparator 61 determines that the bits are in the prearranged relationship such as being both one or both zero in any given frame. However, if the comparator ceases to detect the prearranged relationship, a warning is provided at the output of comparator 61. Thus, when evidence of correlation in the security bit time slot between the guard transmitter and secure core transmitter sections is absent, changes, or ceases to be yielded, impairment of system security may be occurring. Then comparator 61 produces a one bit or warning level via OR-gate 65, which produces a system security warning 25 if the same has not already been activated by other monitoring circuits. Temporary out-of-frame conditions should not activate a security warning unless they persist for a considerable length of time. Accordingly, information from the framing detector 68 is utilized by the security check bit comparator 61.

One means of implementing a specific form of the security check bit comparator 61 is such that it produces an output level called 61WARNING electrically realizing the following formula:

$$61\text{WARNING} = D48 \circ [S \circ \overline{GS} \text{ OR } \overline{S} \circ GS] \circ [\text{NOT(OUT OF FRAME)} \text{ OR THRESHOLD}[\int (\text{OUT OF FRAME})dt]. \quad (2)$$

S is the secure signal and GS is the guard signal. " $\circ$ " indicates the Boolean AND. The expression $D48 \circ (S \circ \overline{GS} \text{ OR } \overline{S} \circ GS)$ is always zero so long as the security check bits 48 in the secure and guard channels are identical. The formula also requires that the system be in frame (that is NOT(OUT OF FRAME)=1) in order for warning to be produced in one aspect of the operation of comparator 61. On the other hand, the design of the circuit must recognize that an out-of-frame condition which persists for long periods may be indicative of compromise of system security and almost certainly is indicative of system malfunction. Therefore, equation (2) also includes an integration of the OUT OF FRAME output level of framing detector 68, which then is applied to a threshold detector which turns on a relatively long persisting one warning level to OR-gate 65. The length of integration preferably exceeds 64 framing intervals or 64 milliseconds, and is suitably on the order of 100 milliseconds.

Guard bit monitor 64 is a circuit having the purpose of monitoring time slot 32 in the secure channel for the presence of any crosstalk from the random ones in guard signal time slot 32 into the secure channel. The guard bit monitor 64 also checks the guard signal itself in time slot 32 for any persistent absence of transmissions in that time slot. The monitor is inhibited from operation when the receiver is out of frame, to avoid an erroneous security warning. Accordingly, this circuit has inputs from the raw preamplified secure signal output of preamplifier 52, the regenerated guard signal output of regenerator 60, the system pulse D32 from timing generator 71, and the output of framing detector 68. The guard bit monitor 64 is suitably constructed to realize the following Boolean function, called 64WARNING.

$$64\text{WARNING} = \left[ \text{THRESHOLD}[\int_{\Delta t} S \circ D32 dt] \text{ OR} \right. \quad (3)$$

$$\left. \text{THRESHOLD}[\int_{\Delta t1} \overline{GS} \circ D32 dt] \right] [\text{NOT(OUT OF FRAME)}].$$

A circuit constructed to realize equation (3) suitably includes a threshold detector to turn on a presisting warning one level when S D32, which is the raw signal in time slot 32 in the secure channel, is integrated over a preset time interval $\Delta t$ for a good signal to noise ratio and the integration exceeds a crosstalk threshold level. Also, a presistent warning should be turned on if $\overline{GS} \circ D32$, which is the Boolean inverse of the regenerated guard signal in time slot 32, exceeds a threshold when integrated over some suitable preset previous time interval $\Delta t_1$.

If crosstalking has occurred from the guard channel into the secure channel this will be detected by guard bit monitor 64 when the tag pulse energy level portion in the secure channel during guard bit time slot 32 changes or seceeds a predetermined threshold energy background level, indicating that a portion of the guard signal tag or identifier component is found to be present in the secure channel. In that even guard bit monitor 64 transmits a 1 to OR-gate 65. The system security warning 25 thus produced is in turn transmitted to transmitter 22' to alert the user of telephone 20 via indicator 19.

Still other system security checks may be performed and results conveyed to warning inputs like 66 of OR-gate 65. For example, the frequency spectra of the transmitter LEDs 35 and 38a-38d may be checked like a "fingerprint" periodically at the receiver end to guard against some form of system compromise due to substitution of bogus optical signals. Where transient monitor output warning pulses are involved, OR-gate 65 should be followed by a trigger circuit or latching relay circuit for producing a warning 25 preferably minutes in length unless deliberately cut off sooner.

It is to be emphasized that security alarms registering on indicators 19 and 19' of secure telephone 20 and interface unit 17 are unusual conditions. Ordinarily the user of the system should have a positive indication of system security.

FIG. 8 further illustrates the optical fiber links 23 and 23'. A longitudinal section of composite optical fiber such as fiber 3 of FIGS. 1 and 2 is shown at the center of FIG. 8 with secure core 9, guard cores 11b and 11d, cladding matrix parts 12a and 12b encasing the cores, and nontransmissive film 10. It will be noted that film 10 surrounds the secure core 9 all along its length to prevent escape of the secure signal therethrough but leaves the guard cores 11 optically exposed to the rest of the environment.

Optical fiber 3 is of very fine threadlike dimensions and is coupled by means of splices 83 and 84 to taper couplers 81 and 82 at interfaces 85 and 86. The splices may be accomplished according to prior art splicing techniques such as those of Kapron U.S. Pat. No. 3,779,628, Buhite U.S. Pat. No. 3,810,802, Allard U.S. Pat. No. 3,951,515, and Trambarulo U.S. Pat. No. 3,734,594. In this way the cores in fiber 3 are coupled to corresponding cores in the taper couplers 81 and 82. In turn the taper couplers 81 and 82 are respectively shown epoxied to fibers 45b, 45d, 45s, 50b, 50d, and 50s, which are ordinary optical fibers respectively having a single core surrounded by a single cladding. Encapsulation and protective material, not shown, surround the epoxy splices. In this manner secure core 9 is coupled to fibers 45s and 50s, which in turn are coupled to transmitter 22 and receiver 24 respectively. Likewise, the guard cores 11 are coupled to fibers 45a–45d and fibers 50a–50d, which in turn are coupled to the guard sections of the transmitter and receiver as previously described.

Figure 9:
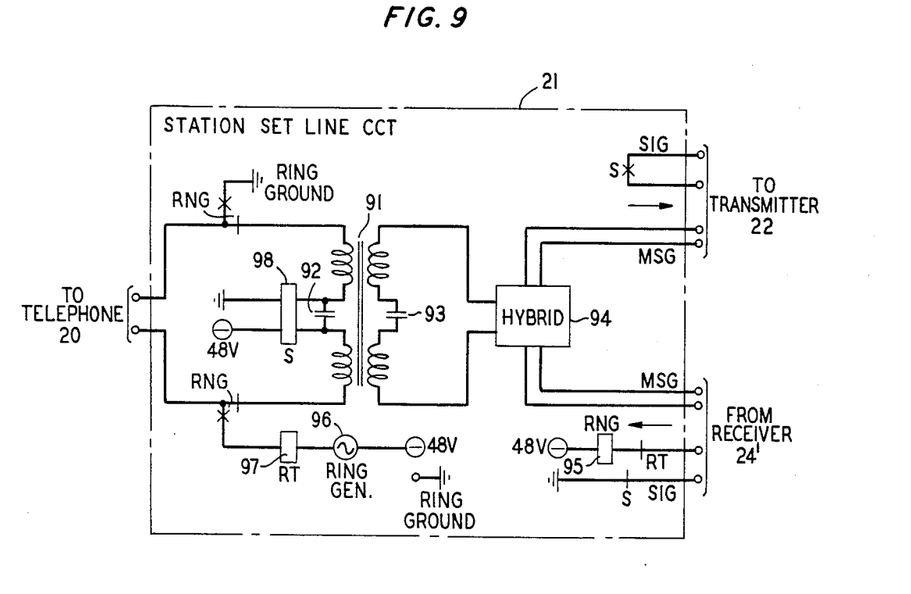
FIG. 9 is partially schematic, partially block diagram of a station set line circuit for use in a subscriber interface unit such as in FIG. 4.
Figure 10:
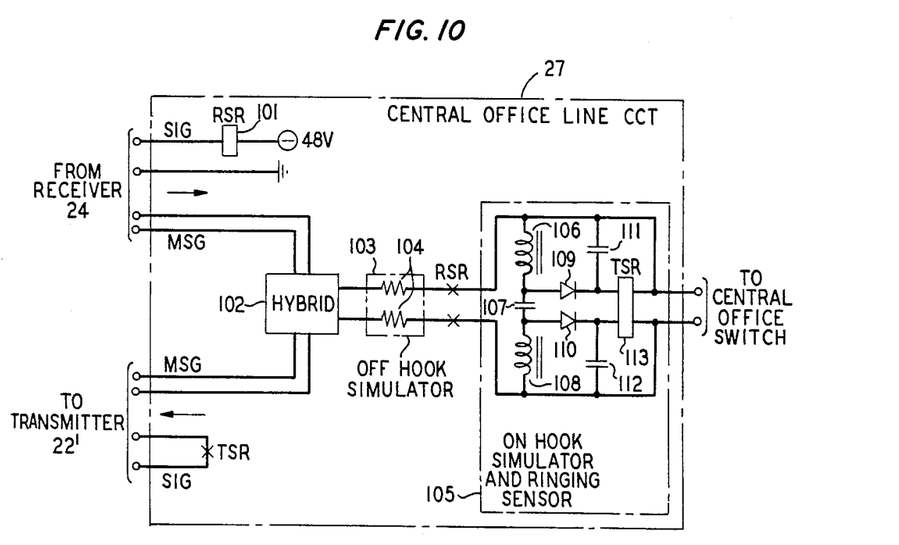
FIG. 10 is a partially schematic, partially block diagram of a central office line circuit for use in a central office interface unit such as in FIG. 4.

FIGS. 9 and 10 respectively show, for purposes of completeness, schematic diagrams of a station set line circuit and a central office line circuit for use as line circuits 21 and 27 in the system of FIG. 4. Since line circuits in general are well known to the art, it will be appreciated that the illustrated line circuits or any other suitable common type may be adapted for use in practicing the invention.

The description of the operation of the invention in response to a call from telephone 20' to telephone 20 serves to illustrate the functioning of the line circuits. Telephone 20' of FIG. 4 causes the central office circuitry 28 to generate 90 volt rms, 20 Hertz, ringing voltage at On Hook Simulator and Ringing Sensor 105 of FIG. 10. Alternating current flows in inductors 106 and 108 and capacitor 107, and some of the current is rectified by diodes 109 and 110, smoothed by capacitors 111 and 112, and used to energize the slow release split-winding transmitter signaling relay (TSR) 113. The TSR closes the normally open TSR contact connected to the input of transmitter 22'. Transmitter 22' sends signaling pulses in time slot 56 of FIG. 6 to receiver 24' which in turn closes a relay or turns on a transistor in the signaling detector 72 of FIG. 7. Then referring to FIG. 9, current flows from a −48 volt source through a ringing (RNG) relay coil 95, through a normally closed ring trip (RT) relay contact, through the receiver 24' relay or transistor not shown, through a normally closed supervisory (S) relay contact and on to ground. Energy in the RNG relay coil 95, which is slow operating to minimize susceptibility to noise, connects telephone 20 so that its telephone bell rings. This occurs because a circuit is completed througn the −48 volt supply, ringing generator 96 (90 v rms at 20 Hertz) slow release ring trip (RT) relay coil 97, telephone 20, the normally open RNG relay contacts, and back to the supply via ring ground.

The telephone, which can be an ordinary 500 telephone station set, presents an open circuit to DC but not AC in the on-hook condition. When the telephone is answered, the phone goes off-hook, permitting DC to flow, thereby actuating the RT relay 97. RT relay 97 in turn opens the circuit including RNG relay coil 95. Then deenergized RNG relay 95 disconnects the ringing circuit 96, 97 and connects telephone 20 to transformer 91, capacitor 92 and split winding fast operating supervisory (S) relay 98 connected to the −48 volt supply. Supervisory relay coil 98 is energized by DC current which has a path completed through telephone 20, and quickly assumes the subsequently released RT relay function of preventing further ringing by opening a contact in the received signaling path through RNG relay 95. Supervisory relay 98 also closes the signaling (SIG) circuit leading to transmitter 22. At the same time voice communications pass through voice transformer 91, capacitors 92 and 93 and hybrid 94. Message (MSG) information from telephone 20 is routed by the hybrid 94 to transmitter 22, and message (MSG) information from receiver 24' passes through hybrid 94 to telephone 20.

Now that telephone 20 is off-hook and the transmitter 22 signaling circuit is closed by relay S, signaling information passes to receiver 24, which closes a relay or turns on a transistor, not shown, in its signaling detector and permits the receiver signaling relay (RSR) coil 101 to be energized by the −48 volt supply in central office line circuit 27 of FIG. 10. The RSR relay closes the normally open RSR contacts, permitting the central office switch to see a DC path into hybrid 102 through off-hook simulator pad 103, including resistors 104. Then the central office switch 28 turns off ringing voltage in a well known manner by means not shown and connects telephone 20' into the voice circuit to hybrid 102. Massage information passes from receiver 24 through hybrid 102 to telephone 20' and from telephone 20' through hybrid 102 to the message (MSG) path to transmitter 22', and the secure telephone call is completed in accordance with the invention.

In all cases it is to be understood that the foregoing description of specific embodiments of the present invention is merely illustrative of the broader scope thereof. Numerous other embodiments of the invention may be constructed by those skilled in the art for specific applications so as to fully realize the utility of the present invention.

What is claimed is:

1. A secure subscriber loop optical communications system comprising:
   subscriber station set means for sending outgoing message and signaling information and receiving incoming message and signaling information;
   subscriber optical transmitter means having a message input, a signaling input, and a central office warning input and having a first secure optical output incorporating said outgoing information, and a first guard optical output for masking leakage of said first secure output;
   subscriber optical receiver means having a second secure optical input for said incoming information, and a second guard optical input, and having a message output, a signaling output, a subscriber alarm output and a central office warning output communicating to said central office warning input of said subscriber optical transmitter;
   subscriber system security status indication means responsive to said subscriber alarm output;
   station set line apparatus means for routing said outgoing message and signaling information from said station set to said message input and signaling input of said subscriber optical transmitter and routing said message output and said signaling output from said subscriber optical receiver as said incoming information to said station set;
   central office optical receiver means having a first secure optical input and a first guard optical input and having a central office message output, a central office signaling output, a subscriber warning output, and a central office alarm output;
   central office alarm indicator means responsive to said central office alarm output;
   central office optical transmitter means having a central office message input, a central office signaling input, and a subscriber warning input communicating with said subscriber warning output of said central office optical receiver, and having a second secure optical output for said incoming information and a second guard optical output capable of masking leakage of said second secure output;

central office line apparatus means for routing said incoming message and signaling information from a central office line to said central office message input and central office signaling input of said central office optical transmitter and routing said central office message output and said central office signaling output from said central office optical receiver of said outgoing information to said central office line; and optical link means comprising first and second optical fiber transmission lines each having at least two cores encased in a cladding, including a central core surrounded by an opaque film in said cladding and also including at least one guard core exterior to said film;

said central core and said guard core or cores of said first fiber connecting said first secure optical output and first guard optical output of said subscriber optical transmitter respectively to said first secure optical input and said first guard optical input of said central office optical receiver, said central core and guard core or cores of said second fiber connecting said second secure optical output and said second guard optical output of said central office optical transmitter respectively to said second secure optical input and said second guard optical input of said subscriber optical receiver, any said leakage from each said secure core through each said film of each said fiber being masked by each said guard signal output respectively;

said first secure optical input and said first guard optical input being monitored by said central office optical receiver so as to produce said subscriber warning when tampering on said first fiber is detected, said second secure optical input and said second guard optical input being monitored by said subscriber optical receiver so as to produce said central office warning when tampering on said second fiber is detected;

whereby a more secure subscriber loop is achieved.

2. A secure fiber optic communications system comprising transmitter means, an optical fiber link having first and second cores, and optical reception means, said transmitter means comprising clock means;

means for producing a first bit stream in a digital format from a first communications signal in a manner responsive to said clock;

electrically driven first light emitting means for introducing said first bit stream into a first core of said optical fiber link;

means for producing a second bit stream in a manner responsive to said clock; and electrically driven second light emitting means for introducing said second bit stream into at least a second core of said optical fiber link;

said optical fiber link comprising a composite optical fiber including said first core and said second core in a cladding matrix, said first core being surrounded by a metallic film in said matrix all along the length of said first core so that escape of light from said first core through said metallic film is essentially prevented, said second core being exterior to said metallic film;

said optical reception means comprising first photodetection means for obtaining said first bit stream from a first optical signal receivable after transmission through said first core;

second photodetection means for obtaining said second bit stream from at least one second optical signal receivable after transmission through said at least said second core; and means for monitoring said first and second bit streams so as to detect changes therein indicative of tampering or malfunction and to provide a warning when said changes are detected.

3. A secure fiber optic communications system as claimed in claim 2 wherein said digital producing means in said transmitter means comprises pulse amplitude modulation (PAM) means for sampling said first communications signal to produce a sampler output, a pulse code modulation (PCM) unit driven by said clock for encoding said PAM sampler output into PCM, and means ultimately responsive to said clock for producing system bits and combining said system bits with said PCM encoded sampler output to produce said first bit stream in said optical format.

4. A secure fiber optic communications system as claimed in claim 2 wherein said digital producing means in said transmitter means repetitively provides at least one framing bit in said format thereby to enable identification of time slots; and said digital producing means is also responsive to said means for producing a second bit stream so as to insert a security bit at a specific time slot in said format of said first bit stream so that said security bit has a prearranged relationship to a corresponding bit in said second bit stream; and said monitoring means in said optical reception means comprises means responsive to said first bit stream for time slot identification and means for comparing said security bit in said first bit stream in said specific time slot with said corresponding bit in said second bit stream so as to determine whether the compared bits have the relationship prearranged at said transmitter, said warning being provided when said relationship ceases to be detected by the comparing means.

5. A secure fiber optic communications system as claimed in claim 2 wherein said digital producing means in said transmitter means repetitively provides at least one framing bit in said format thereby to enable identification of time slots, said first bit stream having essentially zero energy transmitted at a specific time slot; and said monitoring means in said optical reception means comprises means responsive to said first bit stream for time slot identification and guard bit monitor means responsive to said first bit stream in said specific time slot, said warning being provided when said guard bit monitor means detects significant energy in said time slot.

6. A secure optical fiber communications system comprising first and second transmitter-link-optical reception units, each unit being as claimed in claim 2, wherein said warning of said optical reception means of said first unit is conveyed to said transmitter means of said second unit;

said digital producing means in said transmitting means of said second unit repetitively provides at least one framing bit in said format thereby to enable identification of time slots, and said second unit transmitter digital producing means is also responsive to said first warning signal so as to insert an integrity check bit at a specific time slot in said format; and said monitoring means of said optical reception means of said second unit comprises means responsive to said first bit stream from said second unit transmitter for time slot identification and integrity check bit monitor means responsive to said first bit stream in said specific time slot, an alarm being provided when said integrity bit changes in response to said first warning signal.

7. A secure optical transmission line including a first optical waveguide surrounded by a plurality of security optical waveguides, wherein said first optical waveguide and each of said security waveguides includes a core region surrounded by a cladding of lower refractive index;

CHARACTERIZED IN THAT said line includes means for optically isolating said first waveguide from said plurality of security waveguides;

and in that the core regions of all the security waveguides are enbedded in and are in contact with a common cladding surrounding said optical isolating means.

8. An optical communication system comprising:

first and second signal sources of otpical wave energy;

an optical receiver;

and an optical transmission line connecting said sources to said receiver,

CHARACTERIZED IN THAT said line includes:

a first secure optical wavepath, coupled to said first source, comprising a core region surrounded by a cladding of lower refractive index said first wavepath being further surrounded by an absorbing layer and a plurality of guard wavepaths coupled to said second source;

and in that each of said guard wavepaths comprises a core region embedded in and in contact with a common cladding surrounding said absorbing layer.

9. The system according to claim 8 wherein said receiver includes means for separately receiving the signal from said first source, carried by said first wavepath, and the signal from said second source, carried by said guard wavepaths.

10. The system according to claim 9 wherein said receiver includes:

means for monitoring the amplitude of the signal from said second source;

and means for producing a system security warning when said signal amplitude departs from a prescribed level.

11. The system according to claim 8 wherein:

said signal sources produce first and second signals which are related to each other in a manner which permits comparing said signals to yield evidence of said relationship, and means, included in said receiver, for making said comparison and producing a system security warning when evidence of said relationship is absent.

12. The system according to claim 10 wherein said signals are pulse encoded and include synchronized security bits;

and wherein said receiver includes means for comparing said security bits in said signals.

13. The system according to claim 8 wherein the signal produced by said second source includes a tag component not included in the signal produced by said first source;

and wherein said receiver includes means for monitoring said first signal for the presence of said tag component and for producing a system security warning when said tag component is detected.

* * * * *